(12) United States Patent
Höfler

(10) Patent No.: US 7,355,766 B2
(45) Date of Patent: Apr. 8, 2008

(54) DEVICE FOR DIGITAL IMAGING AND STORAGE OF A DOCUMENT

(76) Inventor: Kurt Höfler, Steingasse 14b, Linz (AT) A 4020

( * ) Notice: Subject to any disclaimer, the term of this patent is extended or adjusted under 35 U.S.C. 154(b) by 1142 days.

(21) Appl. No.: 10/467,108

(22) PCT Filed: Feb. 5, 2002

(86) PCT No.: PCT/AT02/00041

§ 371 (c)(1),
(2), (4) Date: Aug. 5, 2003

(87) PCT Pub. No.: WO02/063445

PCT Pub. Date: Aug. 15, 2002

(65) Prior Publication Data

US 2004/0066545 A1   Apr. 8, 2004

(30) Foreign Application Priority Data

Feb. 7, 2001   (AT)   ................................ A 190/2001

(51) Int. Cl.
*H04N 1/46* (2006.01)
(52) U.S. Cl. ........................................ 358/518; 358/501
(58) Field of Classification Search ................ 358/400, 358/471, 447, 452, 474, 479, 501, 505, 522, 358/530, 518, 444, 404, 1.16
See application file for complete search history.

(56) References Cited

U.S. PATENT DOCUMENTS 5,395,178 A * 3/1995 Chvojcsek .................. 403/349
5,442,512 A   8/1995 Bradbury
5,892,509 A * 4/1999 Jakobs et al. ................ 715/751
5,892,588 A   4/1999 Samworth (Continued)

FOREIGN PATENT DOCUMENTS

WO   WO98/22 888   5/1998

(Continued)

OTHER PUBLICATIONS

International Search Report.

*Primary Examiner*—Jerome Grant, II
(74) *Attorney, Agent, or Firm*—Collard & Roe, P.C.

(57) ABSTRACT

An apparatus is described for the digital imaging and storing of a document with a digital image capturing device and with an evaluation circuit for the digital image which can be stored in a memory which evaluation circuit can be connected to the digital image capturing device and is formed by a computer. In order to provide an advantageous precondition for the mobile use of such apparatuses it is proposed that the digital image capturing device consists of a digital camera that from the stored digital image two digital image files can be derived through the evaluation circuit, one the one hand for color images with low resolution and on the other hand for monochrome images in a two-tone representation with high resolution, and can be read into memory units that a portable carrying-case-like container is provided for the computer, its input device, and the digital camera whose opened lid forms a stand for an extension arm for receiving the digital camera and that the container comprises a cover that can be opened the carrying-case space as a support for the document to be captured.

4 Claims, 1 Drawing Sheet

U.S. PATENT DOCUMENTS 5,948,086 A     9/1999   Lin
6,005,680 A *  12/1999   Luther et al. ................ 358/2.1
6,078,407 A     6/2000   Ma

FOREIGN PATENT DOCUMENTS

| WO | WO00/54129 | 9/2000 |
| WO | WO 00/54129 | 9/2000 |
| WO | WO 02/063445 * | 2/2002 |

* cited by examiner

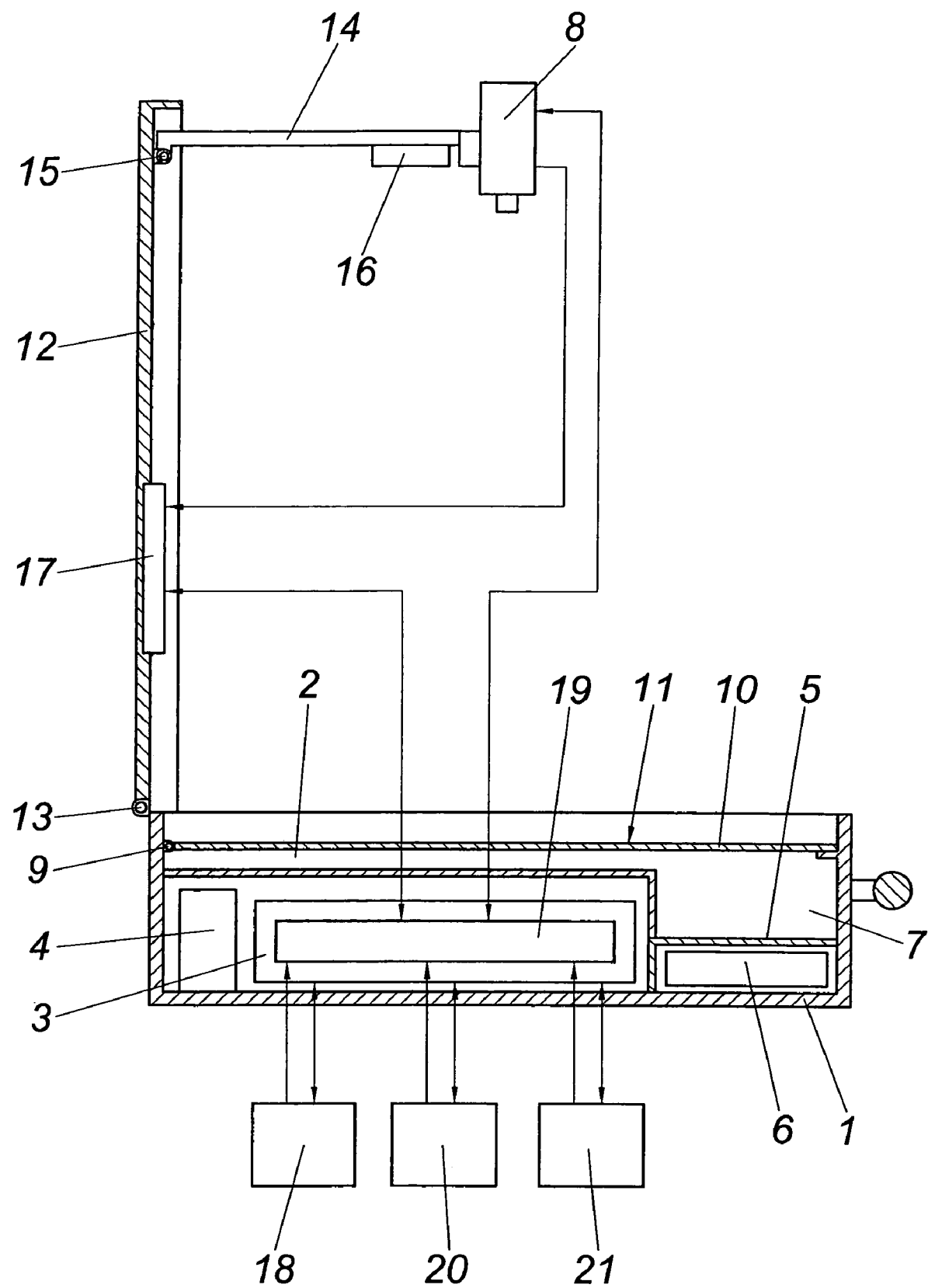

DEVICE FOR DIGITAL IMAGING AND STORAGE OF A DOCUMENT

CROSS REFERENCE TO RELATED APPLICATIONS

Applicant claims priority under 35 U.S.C. §119 of Austrian Application No. A190/2001 filed Feb. 7, 2001. Applicant also claims priority under 35 U.S.C. §365 of PCT/AT02/00041 filed Feb. 5, 2002. The international application under PCT article 21(2) was not published in English.

FIELD OF THE INVENTION

The invention relates to an apparatus for the digital imaging and storing of a document with a digital image capturing device and with an evaluation circuit for the digital image which can be stored in a memory, which evaluation circuit can be connected to the digital image capturing device and is formed by a computer.

DESCRIPTION OF THE PRIOR ART

For the purpose of digital imaging of documents, digital picture scanning devices in the form of scanners are used through which the captured digital pixels of the images are saved in order to manage the digital image files with the help of programs by using computers. Evaluation circuits which are formed by computers can be used to edit and print the stored image files as required. The efforts in connection with said known scanners for digital imaging and storing of documents make such a usually stationary device unsuitable for mobile use. Moreover, said known scanners can only be used economically when the documents to be imaged are supplied in stacks.

In order to enable a courier service to carry out the easy identification of packets which due to deficient information on the delivery address cannot be delivered and are therefore intermediately stored it is known (WO 98/22 888 A1) to store a digital image of said packets which is produced by means of a digital camera. Key data such as a predominant color or the packet size which can be obtained from the image from a predetermined image scale are obtained through an evaluation circuit and stored separately according to a specific packet for simplifying the search. This known image scanning device is not suitable for digital imaging and storing documents whose content is to be scanned with the lowest possible loss of information with a comparatively low amount of storage space.

SUMMARY OF THE INVENTION

The invention is based on the object of providing an apparatus for digital imaging and storing documents in such a way that an economical scanning and storing of the scanned documents is possible on site, namely under the condition of the simplest possible handling.

This object is achieved in accordance with the invention in such a way that the digital image capturing device consists of a digital camera, that from the stored digital image two digital image files can be derived through the evaluation circuit, one the one hand for color images with low resolution and on the other hand for monochrome images in a two-tone representation with high resolution, and can be read into memory units, that a portable carrying-case,-like container is provided for the computer, its input device and the digital camera whose opened lid forms a stand for an extension arm for receiving the digital camera, and that the container comprises a cover that can be opened for the carrying-case space as a support for the document to be captured.

By providing a commercially available digital camera which must ensure a respectively high resolution of the digital image however, low recording times for the document imaging can be ensured as a result of the simultaneous scanning of all pixels in comparison with the line-by-line pixel scanning of conventional scanners. Moreover, the imaging by the digital camera is not limited to two-dimensional documents. Since two digital image files can be derived from the digital imaging of a document by way of the evaluation circuit which produces on the one hand a color image of low resolution and on the other hand a monochrome image in two-tone representation of high resolution, the potentially large amount of data of the digital imaging of a document can be reduced considerably without having to take into account any meaningful loss of information. The monochrome two-tone representation corresponds to the usual black and white analogue copy of a document and, due to the high resolution, offers an imaging precision which is sufficient for post-processing by optical character recognition for example. Since such monochrome two-tone representations cause a loss of image information in the case of colored documents or different grey shades, this loss of information is substantially compensated by the image file for the color reproduction which does not require any high resolution because the main intention is to display this color representation of the imaged document on a screen in order to enable the reading of characters with a color marking in the background. In this way it is possible to keep the size of the two image documents small in comparison with the digital image of a document as taken by the digital camera without having to make do without the essential image information. With a conventional compression of the image files the current memories can be used advantageously for storing a plurality of documents. Due to the fact that conventional file formats are used, the stored image files can be managed advantageously with conventional programs.

The use of a conventional digital camera further provides an important precondition for the mobile use of such apparatuses because these apparatuses can be combined in a portable, carrying-case-like container. For this purpose the opened lid of the container contains a stand for an extension arm for receiving the digital camera. A cover that can be opened for the carrying-case space forms a support for the document to be scanned.

The computer held in the carrying-case space needs to be connected with the digital camera merely by means of a respective control and data transmission cable in order to start the digital imaging of a document which is placed on the support of the carrying-case space. It is understood that a chargeable power source needs to be provided in the carrying-case-like container in order to enable the power supply both of the computer as well as the digital camera. The input device of the computer as provided for the control of the computer and the digital camera can be stowed in the carrying-case space for transport like the digital camera.

Especially simple operating conditions are obtained when the cover supports a screen which is controlled via the digital camera on the one hand and via the computer on the other hand, so that the screen displays the image of the document as taken by the digital camera on the one hand and allows the operation of the computer via a conventional screen display on the other hand. The changeover of the screen control can advantageously occur via the input device of the computer.

Although the extension arm for receiving the digital camera can be arranged in a removable manner in the cover of the container, especially simple constructional conditions are obtained when the extension is held in a swiveable manner in the cover of the container, since in such a case the power supply for the digital camera can be secured by a cable arranged in the extension arm for example.

Since external light conditions are generally insufficient for a favorable illumination of the document to be scanned it is recommended to provide the extension arm or the cover with an illumination device facing the support for the document, preferably a flashgun device. The power supply for this illumination device can again be provided by the power source situated in the carrying-case space.

BRIEF DESCRIPTION OF THE DRAWINGS

The subject matter of the invention is shown in an exemplary manner in the drawings. An apparatus in accordance with the invention for the digital imaging and storing of a document is shown in a schematic block diagram.

DESCRIPTION OF THE PREFERRED EMBODIMENTS

According to the illustrated embodiment, the apparatus for the digital imaging and storing of a document comprises a portable, carrying-case-like container 1 whose carrying-case space 2 holds a computer 3 with a power source 4 in the form of a chargeable accumulator with a power unit. The container 1 further comprises a withdrawable drawer 5 for an input device 6 of the computer 3, with a membrane keyboard being preferably used. The carrying-case space 2 which forms a receiving means 7 for a digital camera 8 can be closed off by a cover 10 which is swivelable about an axis 9 in order to form a support 11 for a document to be imaged. The cover 12 whose hinge joint is designated with reference numeral 13 forms in a locked opened position a stand for an extension arm 14 for receiving the digital camera 8. Said extension arm 14 which can be swiveled about an axis 15 and can be locked in the state when swung out forms a camera stand together with the opened cover 12 of the container 1, which stand holds the digital camera 8 in a snapshot position which is perpendicular to the support 11, so that especially favorable snapshot conditions can be ensured for imaging a document on the support 11. Since the extension arm 14 is additionally provided with an illumination device 16 such as a ring flash, an illumination of the document to be imaged is ensured which is independent from the outside lighting conditions. The digital camera 8 and the illumination device 16 are connected to the power source 4 like the computer 3.

In the region of the cover 12, a screen 17 is provided which is controlled on the one hand by the computer 3 and on the other hand by the digital camera 8. The computer 3 can therefore be operated via the input device 6 in a conventional manner with the help of the screen 17. When the screen control is switched over via the input device 6 to the digital camera 8, the image of the document as taken by the digital camera 8 is displayed with a respectively low resolution. The screen 17 can therefore be used as a view finder for the digital camera 8. The digital color image as taken by the remote-controlled digital camera 8 is transmitted to the computer 3 and saved there in a memory 18. The data transmission can occur via a data medium belonging to the digital camera 8 or be made directly.

The digital image of the imaged document as stored in the memory 18 is converted into two image files in an evaluation circuit 19 of the computer 3 after having entered a command via the input-device 6, which image files are saved to memory units 20 and 21. These image files each represent a selection of the image files as taken by the digital camera 8. Whereas the one digital image file contains a color representation of the digital image taken in a coarse resolution, the other of the two digital image files comprises a monochrome two-tone image of high resolution. Image information that was lost in the monochrome image file can be queried in a supplementary manner via the image file for the color image. Since the monochrome image file which is saved to the memory unit 21 is used for the printout of the imaged document, a monochrome image of the document can be provided in sufficient quality for the printout or further processing due to the considerably reduced data quantity, comparable with a conventional black and white analogue copy. If certain image regions are not sufficiently readable despite the high resolution of the monochrome image file as a result of lack of color information or lack of half-tones, the color image of memory unit 20 can be additionally output on a screen which despite the low resolution of the color image displays the lacking information with a sufficient precision since screens inherently lead to a lower resolution. It is understood that computer 3 can also be used as a conventional computer, with data exchange with other computers being easily possible via suitable interfaces.

After the evaluation of the digital image of the document as taken by the digital camera 8, the memory 18 can be deleted for this digital image because the digital image files as derived from the digital image and stored in the memory units 20 and 21 contain sufficient information on the imaged document.

Since the memory 18 and the memory units 20 and 21 correspond to folders on the harddrive of the computer, the image files saved to these folders can be managed like any other files, especially when-these files are provided with a standard format, which is easily possible. This opens up numerous possibilities to combine and organize the documents which were digitally captured in the manner as described above in order to find them again by means of suitable search functions. The management of the digitally captured documents can obviously only occur outside of computer 3. It is possible that certain basic data for organization in later databases can already be predetermined on capturing the documents via the digital camera 8.

The invention claimed is:

1. An apparatus for the digital imaging and storing of a document with a digital image capturing device and with an evaluation circuit for the digital image which can be stored in memory, which evaluation circuit can be connected to the digital image capturing device and is formed by a computer, characterized in that the digital image capturing device consists of a digital camera, that from the stored digital image two digital image files can be derived through the evaluation circuit on the one hand for color images with low resolution and on the other hand for monochrome images in a two-tone representation with higher resolution, and can be read into memory units, that a portable carrying-case-like container is proved for the computer, its input device and the digital camera whose opened lid forms a stand for an extension arm for receiving the digital camera, and that the container comprises a cover that can be opened for the carrying-case space as a support for the document to be captured.

2. An apparatus as claimed in claim 1, characterized in that the lid carries a screen which can be controlled on the one hand by the digital camera and on the other hand by the computer.

3. An apparatus as claimed in claim 1, characterized in that the extension arm for receiving the digital camera is held swivelably in the lid of the container.

4. An apparatus as claimed in claim 1, characterized in that the extension arm or the lid comprises an illumination device, preferably a flash device, which faces the support for the document.

* * * * *